(12) United States Patent
Yang et al.

(10) Patent No.: US 10,946,479 B2
(45) Date of Patent: *Mar. 16, 2021

(54) LASER SPOT WELDING OF OVERLAPPING ALUMINUM WORKPIECES

(71) Applicant: GM GLOBAL TECHNOLOGY OPERATIONS LLC, Detroit, MI (US)

(72) Inventors: David Yang, Shanghai (CN); Wu Tao, Tianmen (CN)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 288 days.

This patent is subject to a terminal disclaimer.

(21) Appl. No.: 16/089,038

(22) PCT Filed: Apr. 14, 2016

(86) PCT No.: PCT/CN2016/079226
§ 371 (c)(1),
(2) Date: Sep. 27, 2018

(87) PCT Pub. No.: WO2017/177410
PCT Pub. Date: Oct. 19, 2017

(65) Prior Publication Data
US 2019/0126398 A1 May 2, 2019

(51) Int. Cl.
*B23K 26/22* (2006.01)
*B23K 26/32* (2014.01)
(Continued)

(52) U.S. Cl.
CPC ............ *B23K 26/22* (2013.01); *B23K 26/082* (2015.10); *B23K 26/32* (2013.01); *B23K 2103/10* (2018.08)

(58) Field of Classification Search
CPC .... B23K 26/24; B23K 26/244; B23K 26/082; B23K 26/0006; B23K 26/073;
(Continued)

(56) References Cited

U.S. PATENT DOCUMENTS 4,626,653 A 12/1986 Sciaky et al.
2007/0210042 A1* 9/2007 Forrest ............... B23K 26/0604
219/121.64

FOREIGN PATENT DOCUMENTS

CN 103100795 A 5/2013
EP 0327320 A1 8/1989
(Continued)

OTHER PUBLICATIONS

International Search Report and Written Opinion for application No. PCT/CN2016/079226 dated Jan. 20, 2017, 12 pages.

*Primary Examiner* — Brian W Jennison
(74) *Attorney, Agent, or Firm* — Harness, Dickey & Pierce, P.L.C.

(57) ABSTRACT

A method of laser welding a workpiece stack-up (10) that includes at least two overlapping aluminum workpieces comprises advancing a laser beam (24) relative to a plane of a top surface (20) of the workpiece stack-up (10) and along a beam travel pattern (74) that lies within an annular weld area (82) defined by an inner diameter boundary (86) and an outer diameter boundary (84) on the plane of the top surface (20). The beam travel pattern (74) of the laser beam (24) surrounds a center area encircled by the annular weld area (82) on the plane of the top surface (20) so as to force entrained porosity inwards into a region of the weld joint (72) beneath the center area on the plane of the top surface (20) of the workpiece stack-up (10).

19 Claims, 5 Drawing Sheets

(51) Int. Cl.
*B23K 26/082* (2014.01)
*B23K 103/10* (2006.01)

(58) Field of Classification Search
CPC .. B23K 26/0736; B23K 26/22; B23K 26/322;
B23K 2103/18; B23K 2103/10; B23K
2103/04; B23K 2101/34; B23K 2101/006
See application file for complete search history.

(56) References Cited

FOREIGN PATENT DOCUMENTS

| | | | |
|---|---|---|---|
| JP | 1071480 | A | 3/1998 |
| JP | 2001087879 | A | 4/2001 |
| JP | 2007253179 | A | 10/2007 |
| WO | 2013110214 | A1 | 8/2013 |
| WO | 2016032416 | A1 | 3/2016 |
| WO | 2016192039 | A1 | 12/2016 |
| WO | 2017035728 | A1 | 3/2017 |
| WO | 2017035729 | A1 | 3/2017 |
| WO | 2017075808 | A1 | 5/2017 |
| WO | 2017156723 | A1 | 9/2017 |
| WO | 2017173650 | A1 | 10/2017 |
| WO | 2017173833 | A1 | 10/2017 |

* cited by examiner

LASER SPOT WELDING OF OVERLAPPING ALUMINUM WORKPIECES

TECHNICAL FIELD

The technical field of this disclosure relates generally to laser welding and, more particularly, to a method of laser spot welding together two or more overlapping aluminum workpieces.

BACKGROUND

Laser spot welding is a metal joining process in which a laser beam is directed at a metal workpiece stack-up to provide a concentrated energy source capable of effectuating a weld joint between the overlapping constituent metal workpieces. In general, two or more metal workpieces are first aligned and stacked relative to one another such that their faying surfaces overlap and confront to establish a faying interface (or faying interfaces) within an intended weld site. A laser beam is then directed at a top surface of the workpiece stack-up. The heat generated from the absorption of energy from the laser beam initiates melting of the metal workpieces and establishes a molten weld pool within the workpiece stack-up. The molten weld pool penetrates through the metal workpiece impinged by the laser beam and into the underlying metal workpiece or workpieces to a depth that intersects each of the established faying interfaces. And, if the power density of the laser beam is high enough, a keyhole is produced directly underneath the laser beam and is surrounded by the molten weld pool. A keyhole is a column of vaporized metal derived from the metal workpieces within the workpiece stack-up that may include plasma.

The laser beam creates the molten weld pool in very short order once it impinges the top surface of the workpiece stack-up. After the molten weld pool is formed and stable, the laser beam is advanced along the top surface of the workpiece stack-up while tracking a predetermined weld path, which has conventionally involved moving the laser beam in a straight line or along a curved path such as a circle or a "C-shaped" path. Such advancement of the laser beam translates the molten weld pool along a corresponding route relative to top surface of the workpiece stack-up and leaves behind a trail of molten workpiece material in the wake of the advancing weld pool. This penetrating molten workpiece material cools and solidifies to form a weld joint comprised of resolidified composite workpiece material that fusion welds the overlapping workpieces together.

The automotive industry is interested in using laser spot welding to manufacture parts that can be installed on a vehicle. In one example, a vehicle door body may be fabricated from an inner door panel and an outer door panel that are joined together by a plurality of laser weld joints. The inner and outer door panels are first stacked relative to each other and secured in place by clamps. A laser beam is then sequentially directed at multiple weld sites around the stacked panels in accordance with a programmed sequence to form the plurality of laser weld joints. At each weld site where laser spot welding is performed, the laser beam is directed at the stacked panels and conveyed a short distance to produce the weld joint in one of a variety of configurations including, for example, a spot weld joint, a stitch weld joint, or a staple weld joint. The process of laser spot welding inner and outer door panels (as well as other vehicle part components such as those used to fabricate hoods, deck lids, structural body members, etc.) is typically an automated process that can be carried out quickly and efficiently.

Aluminum workpieces are an intriguing candidate for many automobile component parts and structures due to their high strength-to-weight ratio and their ability to improve the fuel economy of the vehicle. In many applications, the aluminum workpieces in need of joining include a bulk aluminum substrate and a protective coating that covers the substrate. This protective coating may be a refractory oxide coating that forms passively when fresh aluminum is exposed to atmospheric air or some other oxygen-containing medium. In other instances, the protective coating may be a metallic coating comprised of zinc or tin, or it may be a metal oxide conversion coating comprised of oxides of titanium, zirconium, chromium, or silicon, as disclosed in U.S. Patent Application No. US2014/0360986, the entire contents of which are incorporated herein by reference. The protective coating inhibits corrosion of the underlying aluminum substrate through any of a variety of mechanisms depending on the composition of the coating and may provide other favorable enhancements as well.

One of the main challenges involved in laser welding aluminum workpieces is the high solubility of hydrogen in the molten weld pool. Upon solidification of the molten weld pool, dissolved hydrogen becomes trapped, leading to porosity within the weld joint, or it outgasses to cause blowholes and spatter. In addition to the challenges posed by hydrogen solubility in the molten weld pool, the protective coating commonly included in the aluminum workpieces is believed to contribute to the formation of weld defects in the weld joint. When, for example, the protective coating is a refractory oxide coating, the coating is difficult to break apart and disperse due to its high melting point and mechanical toughness. As a result, residual oxides and micro-cracks are oftentimes found in the laser weld joint. In another example, if the protective coating is zinc, the coating may readily vaporize to produce high-pressure zinc vapors that may diffuse into and through the molten weld pool and lead to entrained porosity within the weld joint unless provisions are made to vent the zinc vapors away from the weld site. The other materials mentioned above that may constitute the protective coating can present similar issues that may affect and degrade the mechanical properties of the weld joint.

The unique challenges that underlie the use of laser welding to fusion join aluminum workpieces together have lead many manufactures to reject laser spot welding as a suitable metal joining process despite its potential to bestow a wide range of benefits. In lieu of laser spot welding, these manufacturers have turned to mechanical fasteners, such self piercing rivets or flow-drill screws, to join together two or more aluminum workpieces. Such mechanical fasteners, however, take much longer to put in place and have high consumable costs compared to laser weld joints. They also increase manufacturing complexity and add extra weight to the part being manufactured—weight that is avoided when joining is accomplished by way of autogenous fusion laser weld joints—that offsets some of the weight savings attained through the use of aluminum workpieces in the first place. A laser spot welding strategy that can make the process a more viable option for joining aluminum workpieces would thus be a welcome addition to the art.

SUMMARY OF THE DISCLOSURE

A method of laser spot welding a workpiece stack-up that includes overlapping aluminum workpieces is disclosed. The workpiece stack-up includes two or more aluminum workpieces, and at least one of those aluminum workpieces (and preferably all of the aluminum workpieces) includes a protective surface coating. The term "aluminum workpiece" as used in the present disclosure refers broadly to a workpiece that includes a base aluminum substrate comprised of at least 85 wt % aluminum. Each of the aluminum workpieces may thus include a base aluminum substrate comprised of elemental aluminum or any of a wide variety of aluminum alloys. Moreover, the protective surface coating that covers at least one of the base aluminum substrates of the two or more aluminum workpieces is preferably a refractory oxide coating that passively forms when fresh aluminum is exposed to atmospheric air or some other source of oxygen. In alternative embodiments, however, the protective surface coating may be a zinc coating, a tin coating, or a metal oxide conversion coating. The base aluminum substrate in any or all of the two or more aluminum workpieces may also be subjected to a variety of tempering procedures including annealing, strain hardening, and solution heat treating, if desired.

To begin, the laser spot welding method involves providing a workpiece stack-up that includes two or more overlapping aluminum workpieces. The aluminum workpieces are superimposed on each other such that a faying interface is established between the faying surfaces of each pair of adjacent overlapping aluminum workpieces. For example, in one embodiment, the workpiece stack-up includes first and second aluminum workpieces having first and second faying surfaces, respectively, that overlap and confront one another to establish a single faying interface. In another embodiment, the workpiece stack-up includes an additional third aluminum workpiece situated between the first and second aluminum workpieces. In this way, the first and second aluminum workpieces have first and second faying surfaces, respectively, that overlap and confront opposed faying surfaces of the third aluminum workpiece to establish two faying interfaces. When a third aluminum workpiece is present, the first and second aluminum workpieces may be separate and distinct parts or, alternatively, they may be different portions of the same part, such as when an edge of one part is folded over a free edge of another part.

After the workpiece stack-up is provided, a laser beam is directed at, and impinges, a top surface of the workpiece stack-up to create a molten aluminum weld pool that penetrates into the workpiece stack-up from the top surface towards the bottom surface. The power density of the laser beam is selected to carry out the laser welding method in keyhole welding mode. In keyhole welding mode, the power density of the laser beam is high enough to vaporize the aluminum workpieces and produce a keyhole directly underneath the laser beam within the molten aluminum weld pool. The keyhole provides a conduit for energy absorption deeper into workpiece stack-up which, in turn, facilitates deeper and narrower penetration of the molten aluminum weld pool. As such, the molten aluminum weld pool created during keyhole welding mode typically has a width at the top surface of the workpiece stack-up that is less than the penetration depth of the weld pool. The keyhole preferably penetrates the workpiece stack-up only partially during the disclosed laser spot welding method; that is, the keyhole extends into the workpiece stack-up from the top surface and intersects each faying interface established within the stack-up, but does not extend all the way through the stack-up to the bottom surface.

The laser beam is advanced relative to a plane of the top surface of the workpiece stack-up along a beam travel pattern following creation of the molten aluminum weld pool and the keyhole. Advancing the laser beam along the beam travel pattern translates the keyhole and the molten aluminum weld pool along a route that corresponds to the patterned movement of the laser beam relative to the top surface of the workpiece stack-up. Such advancement of the laser beam along the beam travel pattern leaves behind a trail of molten aluminum workpiece material in the wake of the laser beam and the corresponding route of the weld pool. This trail of molten aluminum workpiece material quickly cools and solidifies into resolidified composite aluminum workpiece material that is comprised of aluminum material from each aluminum workpiece penetrated by the molten aluminum weld pool. The collective resolidified composite aluminum workpiece material obtained from advancing the laser beam along the beam travel pattern provides a spot weld joint that autogenously fusion welds the aluminum workpieces together. After the laser beam has completed its advancement along the beam travel pattern, the laser beam is removed from the top surface of the workpiece stack-up, typically by halting transmission of the laser beam.

The beam travel pattern traced by the laser beam includes one or more weld paths that lie within an annular weld area as projected onto a plane (the x-y plane) of the top surface of the workpiece stack-up. The annular weld area is defined by an outer diameter boundary and an inner diameter boundary. The beam travel pattern of the laser beam surrounds a center area encircled by the annular weld area on the plane of the top surface. The annular weld area can include a circular outer diameter boundary and a circular inner diameter boundary when projected onto the plane of the top surface, although different geometric shapes are certainly possible. The diameter of the inner diameter boundary preferably ranges from 1 mm to 12 mm and a diameter of the outer diameter boundary preferably ranges from 3 mm to 15 mm. As the laser beam moves along the beam travel pattern within the annular weld area, it does so without impinging on the center area. This type of patterned movement of the laser beam forces entrained porosity inwards into a region of the resultant weld joint beneath the center area on the plane of the top surface of the workpiece stack-up. Driving porosity inwards, in turn, results in the weld joint having better strength and mechanical properties since centrally-located porosity is less debilitating than porosity located around the perimeter of the joint.

The one or more weld paths that constitute the beam travel pattern may assume any of a variety of profiles relative to the plane of the top surface of the workpiece stack-up. For example, the one or more weld paths may comprise a plurality of radially-spaced and unconnected circular or elliptical weld paths (such as a series of concentric circular weld paths). In this case, the laser beam jumps between and is advanced along multiple discrete circular/elliptical weld paths in order to translate the molten aluminum weld pool and the associated keyhole along a corresponding series of circular/elliptical routes within the annular weld area. The step size or space between radially-aligned points on each pair of adjacent circular/elliptical weld paths, moreover, can range from 0.01 mm to 0.8 mm. In one implementation, the laser beam is advanced first along a circular/elliptical weld path proximate the outer diameter boundary of the annular weld area which, consequently, is the circular/elliptical weld path that has the largest diameter with respect to the other circular/elliptical weld paths. The laser beam is then advanced along one or more successively smaller circular/elliptical weld paths within the annular weld area until finally being advanced along a circular/elliptical weld path proximate the inner diameter boundary of the annular weld path.

As another example, the one or more weld paths may comprise a spiral weld path that revolves around and expands radially outwardly from a fixed inner point proximate the inner diameter boundary of the annular weld area to a fixed outer point proximate the outer diameter boundary. The various turnings of the spiral weld path may be spaced equidistantly from each other or they may be spaced at varying distances. In one particular example of the tracking the spiral weld path, the laser beam is advanced along a radially-contracting progression of the spiral weld path away from the outer diameter boundary and toward the inner diameter boundary and the center area, which translates the molten aluminum weld pool and the associated keyhole along a corresponding spiral route. And, like before, the step size or space between radially-aligned points on each pair of adjacent turnings of the spiral weld path is greater than 0.01 mm and less than 0.8 mm.

The one or more weld paths of the beam travel pattern may, of course, assume a variety of other spatial profiles in addition to circles, ellipses, and spirals. For example, the one or more weld paths may be a roulette weld path that lies within the annular weld area. One specific type of a roulette weld path that may be employed is an epitrochoidal weld path. An epitrochoidal weld path can appear as a chain of repeating loops that lies between the outer diameter boundary and inner diameter boundary and surrounds the center area located within the annular weld area on the top surface of the workpiece stack-up. When advanced along the epitrochoidal weld path, the laser beam alternately moves closer to and farther away from the inner diameter boundary and the outer diameter boundary of the annular weld area. Many other weld path profiles not expressly described here may also be employed to achieve similar effects and results as the weld path(s) mentioned above and described in more detail below.

Advancing the laser beam along the beam travel pattern within the annular weld area and around the center area is believed to provide the resulting weld joint with satisfactory strength. Specifically, without being bound by theory, it is believed that advancing the laser beam along the one or more weld path(s) within the annular weld area promotes greater disturbance (e.g., fracture and break down, vaporization, or otherwise) of the protective surface coating as well as more effective purging of hydrogen gas from the molten aluminum weld pool as compared to conventional laser welding practices. This, in turn, helps minimize the prevalence of entrained gas porosity and other weld defects within the weld joint that tend to detract from the strength of the weld joint. Additionally, even if some porosity or other defects are present, the advancement of the laser beam radially inwardly along the one or more weld paths of the beam travel pattern can help push those weld discrepancies into the interior of the weld joint, which is thought to be a more innocuous location for porosity and other weld defects in terms of their effect on joint strength.

DETAILED DESCRIPTION

The disclosed method of laser spot welding a workpiece stack-up comprised of two or more overlapping aluminum workpieces calls for advancing a laser beam relative to a plane of a top surface of the workpiece stack-up along a beam travel pattern. The disclosed beam travel pattern includes one or more weld paths that are confined within an annular weld area that surrounds a center area. Any type of laser welding apparatus, including remote and conventional laser welding apparatuses, may be employed to advance the laser beam relative to the top surface of the workpiece stack-up along the beam travel pattern. The laser beam may be a solid-state laser beam or a gas laser beam depending on the characteristics of the aluminum workpieces being joined and the laser welding apparatus being used. Some notable solid-state lasers that may be used are a fiber laser, a disk laser, a direct diode laser beam, and a Nd:YAG laser, and a notable gas laser that may be used is a $CO_2$ laser, although other types of lasers may certainly be used so long as they are able to create the keyhole and the surrounding molten aluminum weld pool. In a preferred implementation of the disclosed method, which is described below in more detail, a remote laser welding apparatus directs and advances a solid-state laser beam at and along the top surface of the workpiece stack-up.

Figure 1:
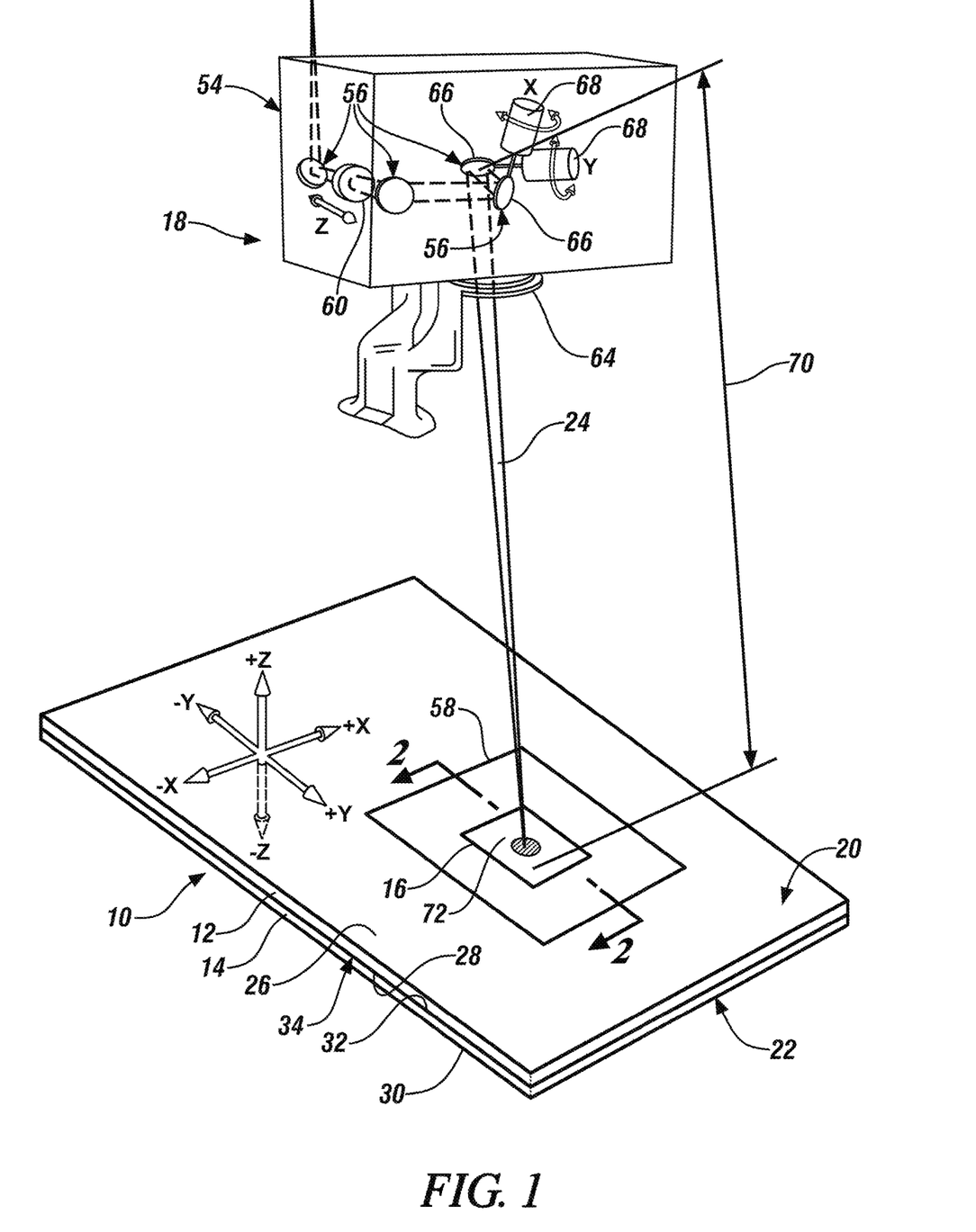
FIG. 1 is a perspective view of an embodiment of a remote laser welding apparatus for producing a laser spot weld joint within a workpiece stack-up that includes two or more overlapping aluminum workpieces.
Figure 2:
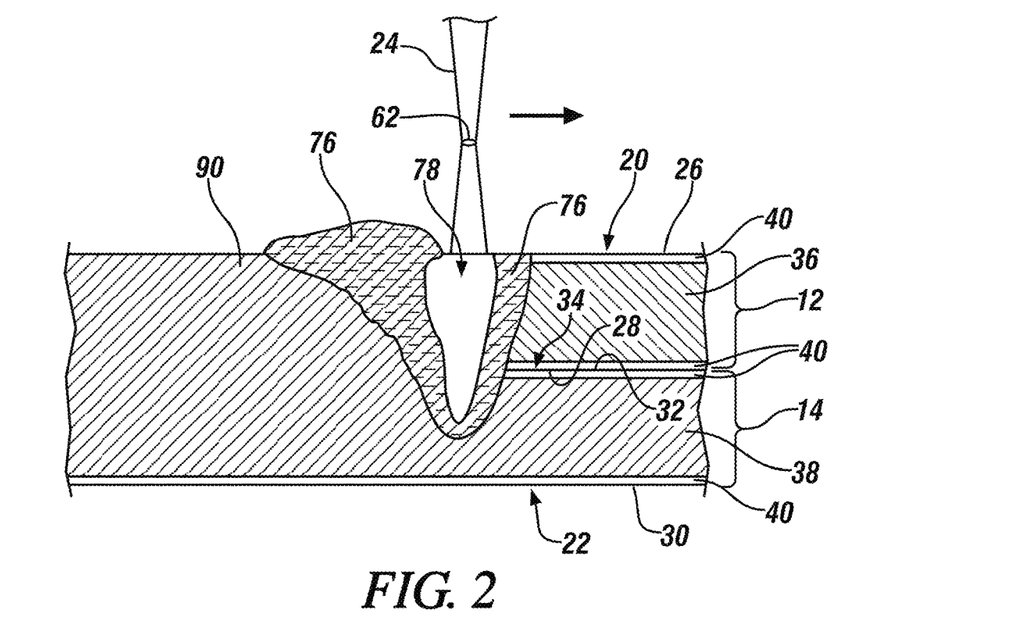
FIG. 2 is a cross-sectional side view (taken along line 2-2) of the workpiece stack-up depicted in FIG. 1 along with a molten aluminum weld pool and a keyhole produced by a laser beam that is impinging a top surface of the workpiece stack-up.
Figure 3:
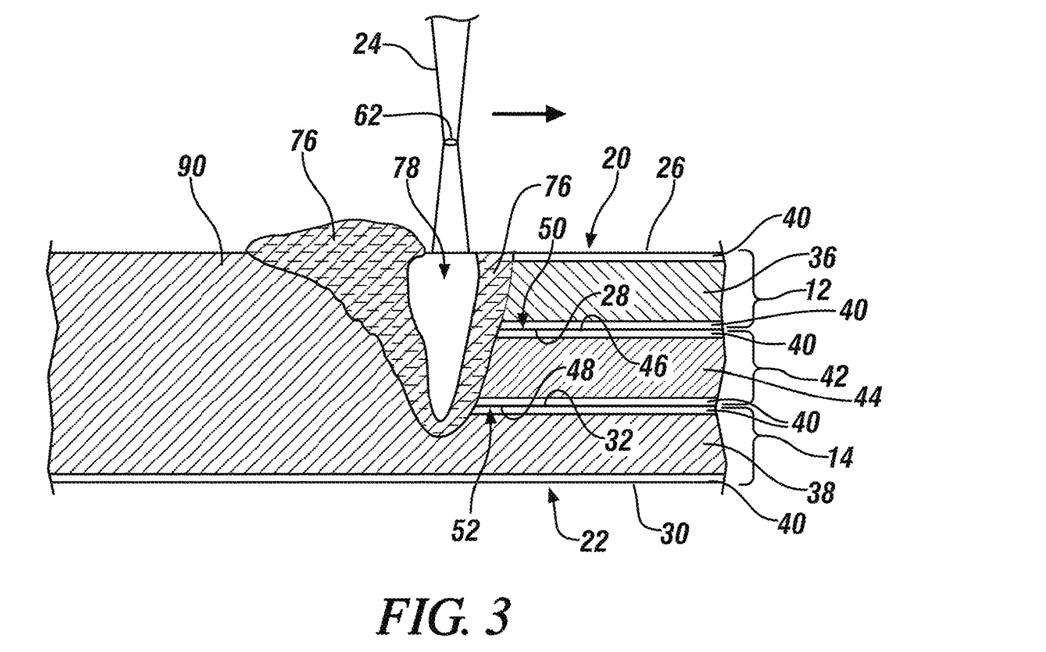
FIG. 3 is a cross-sectional side view of the workpiece stack-up taken from the same perspective as FIG. 2, although here the workpiece stack-up includes three aluminum workpieces that establish two faying interfaces, as opposed to two aluminum workpieces that establish a single faying interface as depicted in FIG. 2.

Referring now to FIGS. 1-3, a method of laser spot welding a workpiece stack-up 10 is illustrated in which the workpiece stack-up 10 includes at least a first aluminum workpiece 12 and a second aluminum workpiece 14 that overlap at a weld site 16 where laser spot welding is practiced using a remote laser welding apparatus 18. The first and second aluminum workpieces 12, 14 provide a top surface 20 and a bottom surface 22, respectively, of the workpiece stack-up 10. The top surface 20 of the workpiece stack-up 10 is made available to the remote laser welding apparatus 18 and can be accessed by a laser beam 24 emanating from the remove laser welding apparatus 18. And since only single side access is needed to perform remote laser welding, there is no need for the bottom surface 22 of the workpiece stack-up 10 to be made available to the remote laser welding apparatus 18 in the same way as the top surface 20. Moreover, while only one weld site 16 is depicted in the Figures for the sake of simplicity, skilled artisans will appreciate that laser welding in accordance with the disclosed method can be practiced at multiple different weld sites spread throughout the same workpiece stack-up 10.

As far as the number of aluminum workpieces present, the workpiece stack-up 10 may, as shown in FIGS. 1-2, include only the first and second aluminum workpieces 12, 14. In this scenario, the first aluminum workpiece 12 includes an outer surface 26 and a first faying surface 28, and the second aluminum workpiece 14 includes an outer surface 30 and a second faying surface 32. The outer surface 26 of the first aluminum workpiece 12 provides the top surface 20 of the workpiece stack-up 10 and the outer surface 30 of the second aluminum workpiece 14 provides the oppositely-facing bottom surface 22 of workpiece stack-up 10. Conversely, since the two aluminum workpieces 12, 14 are the only two workpieces present in the workpiece stack-up 10, the first and second faying surfaces 28, 32 of the first and second aluminum workpieces 12, 14 overlap and confront one another to establish a faying interface 34 that extends through the weld site 16. In other embodiments, one of which is describe below in connection with FIG. 3, the workpiece stack-up 10 may include an additional aluminum workpiece such that the workpiece stack-up 10 includes three aluminum workpieces instead of only two as shown in FIGS. 1-2.

The term "faying interface" is used broadly in the present disclosure and is intended to encompass a wide range of overlapping relationships between the confronting first and second faying surfaces 28, 32 that can accommodate the practice of laser welding. For instance, the faying surfaces 28, 32 may establish the faying interface 34 by being in direct or indirect contact. The faying surfaces 28, 32 are in direct contact with each other when they physically abut and are not separated by a discrete intervening material layer or gaps that fall outside of normal assembly tolerance ranges. The faying surfaces 28, 32 are in indirect contact when they are separated by a discrete intervening material layer—and thus do not experience the type of extensive interfacial abutment that typifies direct contact—yet are in close enough proximity that laser spot welding can be practiced. As another example, the faying surfaces 28, 32 may establish the faying interface 34 by being separated by gaps that are purposefully imposed. Such gaps may be imposed between the faying surfaces 28, 32 by creating protruding features on one or both of the faying surfaces 28, 32 through laser scoring, mechanical dimpling, or otherwise. The protruding features maintain intermittent contact points between the faying surfaces 28, 32 that keep the faying surfaces 28, 32 spaced apart outside of and around the contact points by up to 1.0 mm and, preferably, between 0.2 mm and 0.8 mm.

As shown best in FIG. 2, the first aluminum workpiece 12 includes a first base aluminum substrate 36 and the second aluminum workpiece 14 includes a second base aluminum substrate 38. Each of the base aluminum substrates 36, 38 may be separately composed of aluminum or an aluminum alloy that includes at least 85 wt % aluminum. Some notable aluminum alloys that may constitute the first and/or second base aluminum substrates 36, 38 are an aluminum-magnesium alloy, an aluminum-silicon alloy, an aluminum-magnesium-silicon alloy, or an aluminum-zinc alloy. Additionally, each of the base aluminum substrates 36, 38 may be separately provided in wrought or cast form. For example, each of the base aluminum substrates 36, 38 may be composed of a 4xxx, 5xxx, 6xxx, or 7xxx series wrought aluminum alloy sheet layer, extrusion, forging, or other worked article. Or, as another example, each of the base aluminum substrates 36, 38 may be composed a 4xx.x, 5xx.x, or 7xx.x series aluminum alloy casting. Some more specific kinds of aluminum alloys that can be used as the first and/or second base aluminum substrate 36, 38 include, but are not limited to, AA5754 aluminum-magnesium alloy, AA6022 aluminum-magnesium-silicon alloy, AA7003 aluminum-zinc alloy, and Al-10Si—Mg aluminum die casting alloy. The first and/or second base aluminum substrate 36, 38 may be employed in a variety of tempers including annealed (O), strain hardened (H), and solution heat treated (T) depending on the desired workpiece properties.

At least one of the first or second aluminum workpieces 12, 14—and preferably both—includes a protective surface 40 that overlies the base aluminum substrate 36, 38. Indeed, as shown in FIG. 2, each of the first and second base aluminum substrates 36, 38 is coated with a protective surface coating 40 that, in turn, provides the workpieces 12, 14 with their respective outer surfaces 26, 30 and their respective faying surfaces 28, 32. The protective surface coating 40 may be a refractory oxide coating that forms passively when fresh aluminum from the base aluminum substrate 36, 38 is exposed to atmospheric air or some other oxygen-containing medium. The protective surface coating 40 may also be a metallic coating comprised of zinc or tin, or it may be a metal oxide conversion coating comprised of oxides of titanium, zirconium, chromium, or silicon. A typical thickness of the protective surface coating 38, if present, lies anywhere from 1 nm to 10 µm depending on its composition. Taking into account the thickness of the base aluminum substrates 36, 38 and the protective surface coatings 40, the first and second aluminum workpieces 12, 14 may have thicknesses in the range of 0.3 mm to 6.0 mm, and more narrowly in the range of 0.5 mm to 3.0 mm, at least at the weld site 16. The thicknesses of the first and second aluminum workpieces 12, 14 may be the same as or different from each other.

FIGS. 1-2 illustrate an embodiment of the laser welding method in which the workpiece stack-up 10 includes two overlapping aluminum workpieces 12, 14 that have the single faying interface 34. Of course, as shown in FIG. 3, the workpiece stack-up 10 may include an additional third aluminum workpiece 42 situated between the first and second aluminum workpieces 12, 14. The third aluminum workpiece 42, if present, includes a third base aluminum substrate 44 that may be bare or coated with the same protective surface coating 40 (as shown) described above. Indeed, when the workpiece stack-up 10 includes the first, second, and third overlapping aluminum workpieces 12, 14, 42, the base aluminum substrate 36, 38, 44 of at least one of the workpieces 12, 14, 42, and preferably all of them, includes the protective surface coating 40. As for the characteristics of the third base aluminum substrate 44, the descriptions above regarding the first and second base aluminum substrates 36, 38 are equally applicable to that substrate 44 as well.

As a result of stacking the first, second, and third aluminum workpieces 12, 14, 42 in overlapping fashion to provide the workpiece stack-up 10, the third aluminum workpiece 42 has two faying surfaces 46, 48. One of the faying surfaces 46 overlaps and confronts the first faying surface 28 of the first aluminum workpiece 12 and the other faying surface 48 overlaps and confronts the second faying surface 32 of the second aluminum workpiece 14, thus establishing two faying interfaces 50, 52 within the workpiece stack-up 10 that extend through the weld site 16. These faying interfaces 50, 52 are the same type and encompass the same attributes as the faying interface 34 already described with respect to FIGS. 1-2. Consequently, in this embodiment as described herein, the outer surfaces 26, 30 of the flanking first and second aluminum workpieces 12, 14 still generally face away from each other in opposite directions and constitute the top and bottom surfaces 20, 22 of the workpiece stack-up 10. Skilled artisans will know and appreciate that the laser welding method, including the following disclosure directed to a workpiece stack-up that includes two aluminum workpieces, can be readily adapted and applied to a workpiece stack-up that includes three overlapping aluminum workpieces without undue difficulty.

Referring back to FIGS. 1-3, the remote laser welding apparatus 18 includes a scanning optic laser head 54. The scanning optic laser head 54 directs the laser beam 24 at the top surface 20 of the workpiece stack-up 10 which, here, is provided by the outer surface 26 of the first aluminum workpiece 12. The scanning optic laser head 54 is preferably mounted to a robotic arm (not shown) that can quickly and accurately carry the laser head 54 to many different preselected weld sites on the workpiece stack-up 10 in rapid programmed succession. The laser beam 24 used in conjunction with the scanning optic laser head 54 is preferably a solid-state laser beam and, in particular, a fiber laser beam or a disk laser beam or a direct diode laser beam operating with a wavelength in the near-infrared range (commonly considered to be 700 nm to 1400 nm) of the electromagnetic spectrum. Additionally, the laser beam 24 has a power level capability that can attain a power density sufficient to produce a keyhole within the workpiece stack-up 10. The power density needed to produce a keyhole within overlapping aluminum workpieces is typically in the vicinity of about 1.0 MW/cm$^2$.

A wide variety of fiber, disk, and direct diode laser beams are commercially available and are suitable for use with the scanning optic laser head 54 of the remote laser welding apparatus 18. For example, a preferred fiber laser beam is a diode-pumped laser beam in which the laser gain medium is an optical fiber doped with a rare earth element (e.g., erbium, ytterbium, neodymium, dysprosium, praseodymium, thulium, etc.). As another example, a preferred disk laser beam is a diode-pumped laser beam in which the gain medium is a thin laser crystal disk doped with a rare earth element (e.g., a ytterbium-doped yttrium-aluminum garnet (Yb:YAG) crystal coated with a reflective surface) and mounted to a heat sink. And as yet another example, a preferred direct diode laser beam is a combined laser beam (e.g., wavelength combined) derived from multiple diodes in which the gain medium is semiconductors such as those based on aluminum gallium arsenide (AlGaAS) or indium gallium arsenide (InGaAS). Other solid-state laser beams not specifically mentioned here may of course be used.

The scanning optic laser head 54 includes an arrangement of mirrors 56 that can maneuver the laser beam 24 relative to a plane oriented along a the top surface 20 of the workpiece stack-up 10 within an operating envelope 58 that encompasses the weld site 16. Here, as illustrated in FIG. 1, the plane of the top surface 20 spanned by the operating envelope 58 is labeled the x-y plane since the position of the laser beam 24 within the plane is identified by the "x" and "y" coordinates of a three-dimensional coordinate system. In addition to the arrangement of mirrors 56, the scanning optic laser head 54 also includes a z-axis focal lens 60, which can move a focal point 62 (FIGS. 2-3) of the laser beam 24 along a longitudinal axis of the laser beam 24 to thus vary the location of the focal point 62 in a z-direction that is oriented perpendicular to the x-y plane in the three-dimensional coordinate system established in FIG. 1. Furthermore, to keep dirt and debris from adversely affecting the optical system and the integrity of the laser beam 24, a cover slide 64 may be situated below the scanning optic laser head 54. The cover slide 64 protects the arrangement of mirrors 56 and the z-axis focal lens 60 from the surrounding environment yet allows the laser beam 24 to pass out of the scanning optic laser head 54 without substantial disruption.

The arrangement of mirrors 56 and the z-axis focal lens 60 cooperate during remote laser welding to dictate the desired movement of the laser beam 24 within the operating envelope 58 at the weld site 16 as well as the position of the focal point 62 along the longitudinal axis of the beam 24. The arrangement of mirrors 56, more specifically, includes a pair of tiltable scanning mirrors 66. Each of the tiltable scanning mirrors 66 is mounted on a galvanometer 68. The two tiltable scanning mirrors 66 can move the location at which the laser beam 24 impinges the top surface 20 of the workpiece stack-up 10 anywhere in the x-y plane of the operating envelope 58 through precise coordinated tilting movements executed by the galvanometers 68. At the same time, the z-axis focal lens 60 controls the location of the focal point 62 of the laser beam 24 in order to help administer the laser beam 24 at the correct power density. All of these optical components 60, 66 can be rapidly indexed in a matter of milliseconds or less to advance the laser beam 24 relative to the top surface 20 of the workpiece stack-up 10 along a beam travel pattern that includes one or more weld paths. Several specific examples of the beam travel pattern are described in greater detail below.

A characteristic that differentiates remote laser welding (also sometimes referred to as "welding on the fly") from other conventional forms of laser welding is the focal length of the laser beam 24. Here, as shown in best in FIG. 1, the laser beam 24 has a focal length 70, which is measured as the distance between the focal point 62 and the last tiltable scanning mirror 66 that intercepts and reflects the laser beam 24 prior to the laser beam 24 impinging the top surface 20 of the workpiece stack-up 10 (also the outer surface 26 of the first aluminum workpiece 12). The focal length 70 of the laser beam 24 is preferably in the range of 0.4 meters to 2.0 meters with a diameter of the focal point 62 typically ranging anywhere from 350 μm to 700 μm. The scanning optic laser head 54 shown generally in FIG. 1 and described above, as well as others that may be constructed somewhat differently, are commercially available from a variety of sources. Some notable suppliers of scanning optic laser heads and lasers for use with the remote laser welding apparatus 18 include HIGHYAG (Kleinmachnow, Germany) and TRUMPF Inc. (Farmington, Conn., USA).

In the presently disclosed method, as illustrated generally in the Figures, a laser spot weld joint 72 (FIG. 1) is formed between the first and second aluminum workpieces 12, 14 (or between the first, second, and third aluminum workpieces 12, 14, 42 as shown in FIG. 3) by advancing the laser beam 24 along a particular beam travel pattern 74 (FIGS. 4-6) relative to the plane of the top surface 20 of the workpiece stack-up 10. As shown best in FIGS. 2-3, the laser beam 24 is initially directed at, and impinges, the top surface 20 of the workpiece stack-up 10 within the weld site 16. The heat generated from absorption of the focused energy of the laser beam 24 initiates melting of the first and second aluminum workpieces 12, 14 (and the third aluminum workpiece 42 if present) to create a molten aluminum weld pool 76 that penetrates into the workpiece stack-up 10 from the top surface 20 towards the bottom surface 22. The laser beam 24 also has a power density sufficient to vaporize the workpiece stack-up 10 directly beneath where it impinges the top surface 20 of the stack-up 10. This vaporizing action produces a keyhole 78, which is a column of vaporized aluminum that usually contains plasma. The keyhole 78 is formed within the molten aluminum weld pool 76 and exerts an outwardly-directed vapor pressure sufficient to prevent the surrounding molten aluminum weld pool 76 from collapsing inward.

Like the molten aluminum weld pool 76, the keyhole 78 also penetrates into the workpiece stack-up 10 from the top surface 20 towards the bottom surface 22. The keyhole 78 provides a conduit for the laser beam 24 to deliver energy down into the workpiece stack-up 10, thus facilitating relatively deep and narrow penetration of the molten aluminum weld pool 76 into the workpiece stack-up 10 and a relatively small surrounding heat-affected zone. The keyhole 78 and the surrounding molten aluminum weld pool 76 penetrate the workpiece stack-up 10 and intersect each faying interface 34 (or 50, 52) established within the stack-up 10. In a preferred embodiment, the keyhole 78 and the surrounding molten aluminum weld pool 76 partially penetrate the workpiece stack-up 10, in which case the keyhole 78 and the molten aluminum weld pool 76 extend into the stack-up 10 from the top surface 20, but do not extend all the way to and breach through the bottom surface 22 of the workpiece stack-up 10. The power level, travel velocity, and/or focal point position of the laser beam 24 may be controlled during the laser welding process so that the keyhole 78 and the molten aluminum weld pool 76 penetrate the workpiece stack-up 10 to the appropriate partially-penetrating depth.

After the molten aluminum weld pool 76 and the keyhole 78 are, the laser beam 24 is advanced relative to the plane of the top surface 20 of the workpiece stack-up along the beam travel pattern 74. Advancement of the laser beam 24 along the beam travel pattern 74 is managed by precisely controlling the coordinated movements of the scanning mirrors 66 of the scanning optic laser head 54. Such coordinated movements of the scanning mirrors 66 can rapidly move the laser beam 24 to trace beam travel pattern 74, which has a geometric configuration that enables the weld joint 72 to successfully fuse the first and second aluminum workpieces 12, 14 (and the additional intervening aluminum workpiece 42 if present) together at the weld site 16 despite the fact that at least one of the workpieces 12, 14 (and optionally 42) includes a protective surface coating 40 that tends to be a source of weld defects. The welding laser beam 24 is preferably advanced along the designated beam travel pattern 74 at a relatively high travel velocity that ranges between 2 m/min and 120 m/min or, more narrowly, between 8 m/min and 50 m/min.

Figure 4:
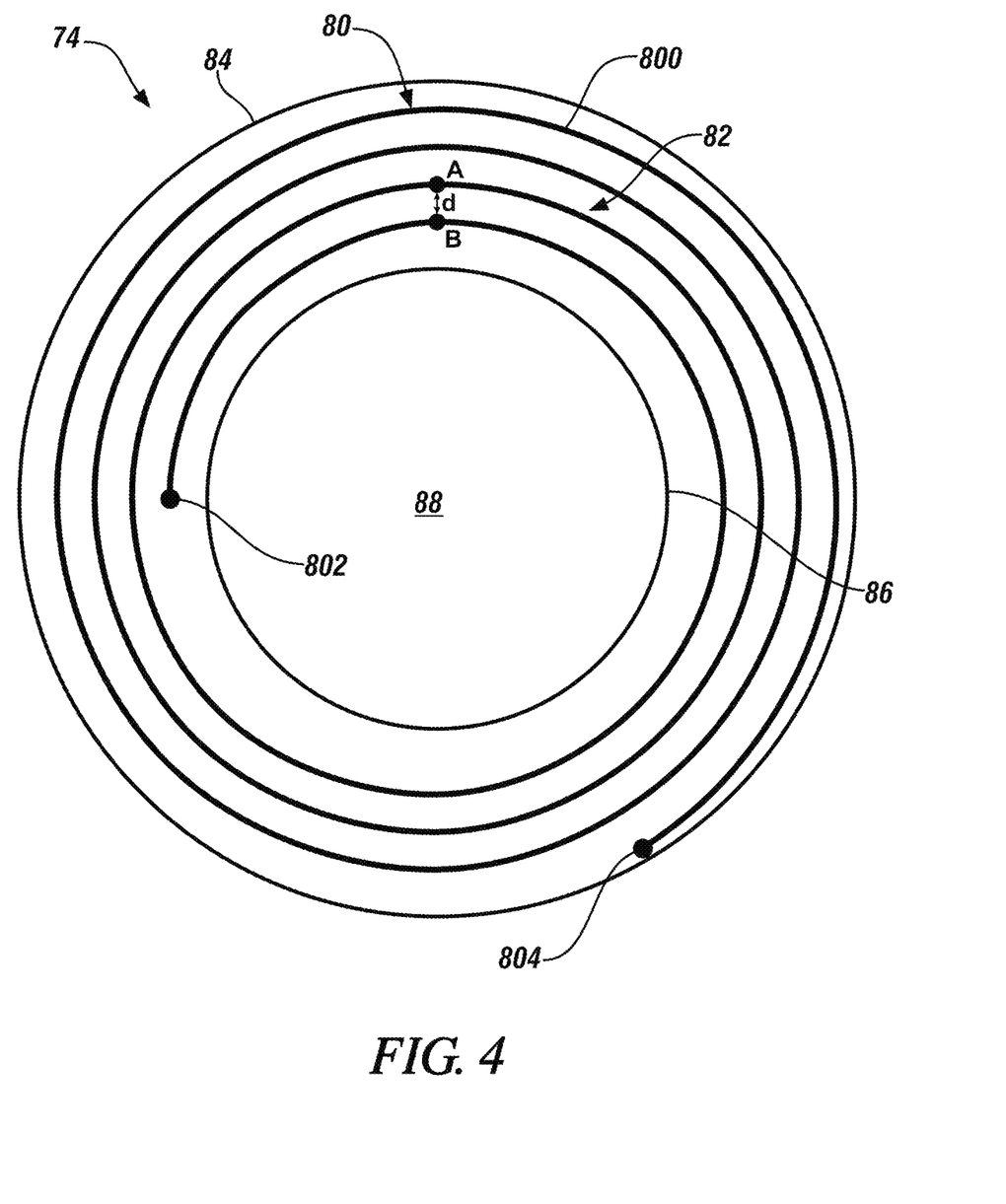
FIG. 4 depicts an embodiment of the beam travel pattern as projected onto the top surface of the workpiece stack-up that may be traced by a laser beam, and thus followed by a keyhole and surrounding molten aluminum weld pool, during formation of a laser spot weld joint between the two or more overlapping aluminum workpieces included in the workpiece stack-up.
Figure 5:
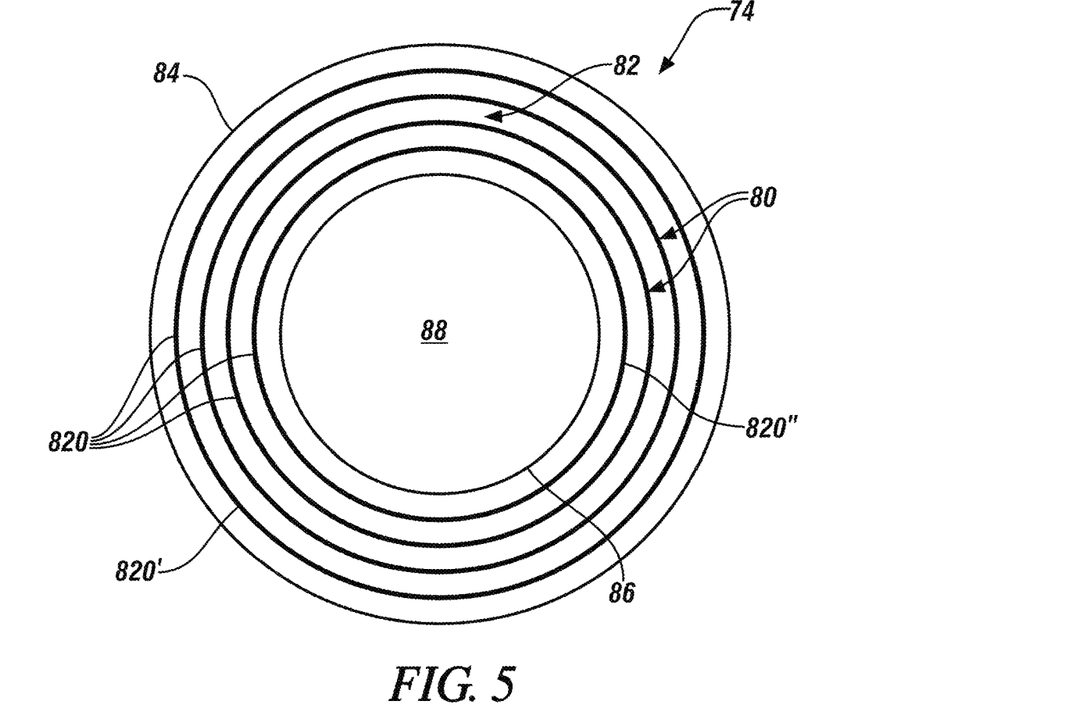
FIG. 5 depicts another embodiment of the beam travel pattern as projected onto the top surface of the workpiece stack-up that may be traced by a laser beam, and thus followed by a keyhole and surrounding molten aluminum weld pool, during formation of a laser spot weld joint between the two or more overlapping aluminum workpieces included in the workpiece stack-up.
Figure 5A:
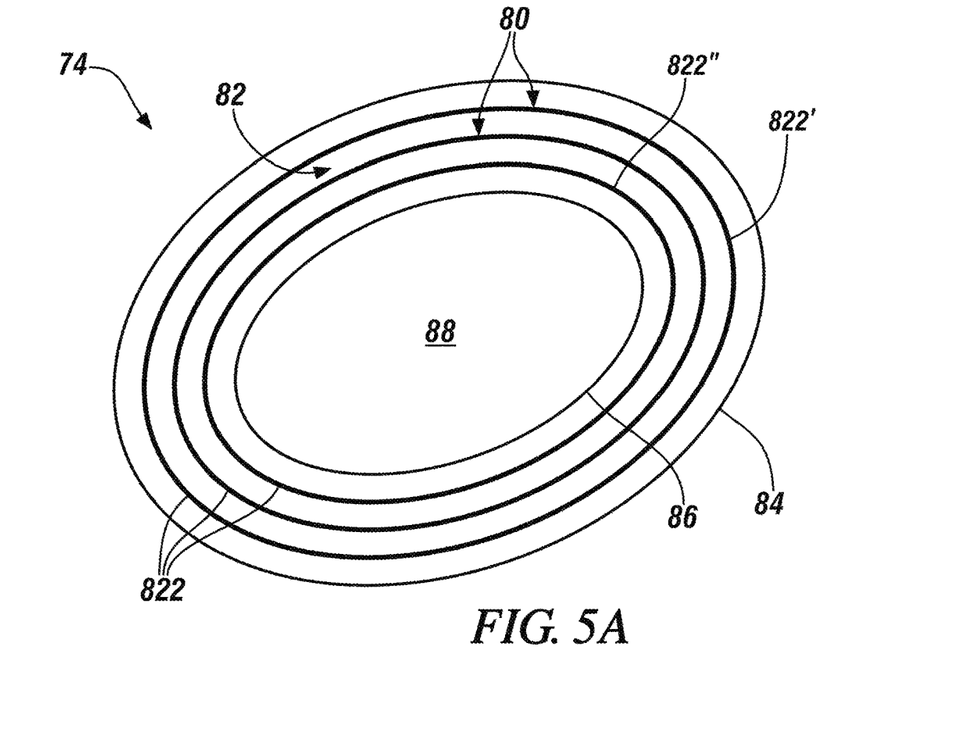
FIG. 5A depicts another embodiment of a beam travel pattern as projected onto the top surface the workpiece stack-up that is similar to the beam travel pattern shown in FIG. 5.
Figure 6:
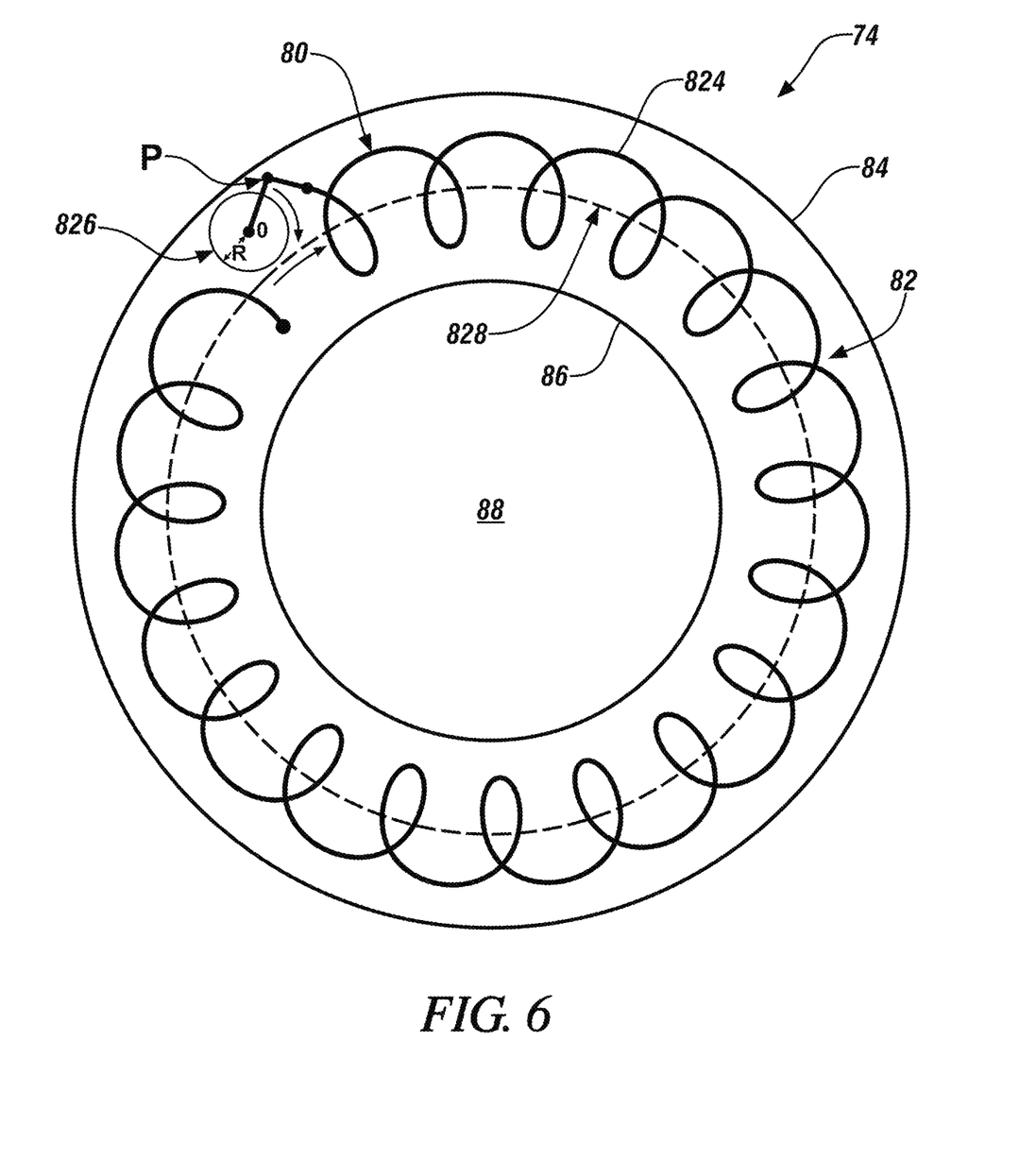
FIG. 6 depicts yet another embodiment of the beam travel pattern as projected onto the top surface of the workpiece stack-up that may be traced by a laser beam, and thus followed by a keyhole and surrounding molten aluminum weld pool, during formation of a laser spot weld joint between the two or more overlapping aluminum workpieces included in the workpiece stack-up.

The beam travel pattern 74 traced by the laser beam 24 may take on a variety of different geometric and spatial configurations. In general, however, the beam travel pattern 74 includes one or more nonlinear weld paths 80 that are confined within an annular weld area 82. The annular weld area 82 is defined by an outer diameter boundary 84 and an inner diameter boundary 86 on the plane of the top surface 20 of the workpiece stack-up 10 and surrounds a center area 88. The outer diameter boundary 84 preferably ranges in diameter from 3 mm to 15 mm while the inner diameter boundary 86 preferably ranges in diameter from 1 mm to 12 mm. Plan views of several representative examples of the beam travel pattern 74 and the annular weld area 82 that confines the beam travel pattern 74 and are shown in FIGS. 4-6. Of those representative examples, FIGS. 4, 5, and 6 show annular weld areas 82 having a circular outer diameter boundary 84 and a circular inner diameter boundary 86. FIG. 5A is slightly different and depicts an annular weld area 82 having elliptical outer and inner diameter boundaries 84, 86.

As noted above, the beam travel pattern 74 is traced by the laser beam 24 with respect to a plane oriented along the top surface 20 of the workpiece stack-up 10 at the weld site 16. As such, the illustrations presented in FIGS. 4-6 are plan views, from above, of various exemplary beam travel patterns projected onto the top surface 20 of the workpiece stack-up 10. These views provide a visual understanding of how the laser beam 24 is advanced relative to the top surface 20 of the workpiece stack-up 10 during formation of the weld joint 72. The one or more nonlinear weld paths 80 within the beam travel pattern 74 may include a single weld path or a plurality of weld paths that include some curvature or deviation from linearity. Such weld paths may be continuously curved or they may be comprised of multiple straight line segments that are connected end-to-end at an angle to one another (i.e., the angle between the connected line segments≠180°).

Referring now to FIGS. 4-6, the beam travel pattern 74 may comprise a closed-curve beam travel pattern, a spiral beam travel pattern, or some other beam travel pattern. A closed-curve beam travel pattern may be any pattern that includes a plurality of radially-spaced and unconnected circular weld paths, elliptical weld paths, or weld paths having like closed curves. A spiral beam travel pattern may be any pattern having a single weld path that revolves around the inner diameter boundary 86 of the annular weld area 82 and includes multiple turnings that are radially spaced apart between the outer and inner diameter boundaries 84, 86 with a preferred number of spiral turnings ranging from two to twenty. A wide variety of other patterns can also be employed as the beam travel pattern 74 including, for example, the roulette beam travel pattern shown in FIG. 6 that includes an epitrochoidal weld path. Variations of these specifically illustrated beam travel patterns 74 as well as other patterns that include nonlinear weld paths may also be traced by the laser beam 24 to form the laser spot weld joint 72.

FIG. 4 illustrates an embodiment of the beam travel pattern 74 that comprises a single nonlinear inner weld path 80 that lies within the annular weld area 82. Specifically, this beam travel pattern 74 embodiment includes a spiral weld path 800 that lies within the annular weld area 82. The spiral weld path 800 of the beam travel pattern 74 originates at a fixed inner point 802, encircles the center area 88 while revolving around the inner diameter boundary 86 of the annular weld area 82, and ends at a fixed outer point 804. The spiral weld path 800 thus revolves around and expands radially outwardly from the fixed inner point 802 to the fixed outer point 804. Moreover, the spiral weld path 800 may be continuously curved, as shown in FIG. 4, and it may be arranged in the form of an Archimedean spiral in which the turnings of the weld path 800 are spaced equidistantly from each other by a distance (d). This distance (d) may be referred to as a step size and it may range between 0.01 mm and 0.8 mm as measured between radially-aligned points A, B on each pair of adjacent turnings. Alternatively, as another example, the spiral weld path 800 may be arranged in the form of an equiangular spiral in which case the adjacent turnings of the spiral get progressively farther apart. One example of an equiangular spiral is defined by the equation $r(\theta)=e^{-0.1(\theta)}$ in which theta is defined in polar coordinates.

FIGS. 5-5A illustrate several embodiments of the beam travel pattern 74 that comprise a plurality of nonlinear weld paths 80 that are distinct from each other in that none of the nonlinear weld paths 80 intersect. Each of the beam travel patterns 74 shown in FIGS. 5-5A, for example, comprises a plurality of radially-spaced and unconnected circular weld paths 820 (FIG. 5) or unconnected elliptical weld paths 822 (FIG. 5A). The circular weld paths 820 and elliptical weld paths 822 are concentrically arranged about the center area 88. These discrete weld paths 820, 822 may be radially spaced evenly apart (FIGS. 5-5A) or they may be spaced apart at varying distances between the outer and inner diameter boundaries 84, 86. In that regard, the circular weld paths 820 include an outermost circular weld path 820' located proximate the outer diameter boundary 84 of the annular weld area 82 and an innermost circular weld path 820" located proximate the inner diameter boundary 86. The elliptical weld paths 822 include similarly located outermost and innermost elliptical weld paths 822', 822". The embodiments of the beam travel patterns 74 illustrated in FIGS. 5-5A preferably include anywhere from two to twenty weld paths 820, 822 or, more narrowly, anywhere from three to eight weld paths 820, 822. And, like the spiral weld path 800 of FIG. 4, the distance (d) between radially-aligned points A, B on adjacent circular or elliptical weld paths 820, 822 (or step size) preferably ranges from 0.01 mm to 0.8 mm.

Other embodiments of the beam travel pattern 74 are indeed contemplated in addition to those shown in FIGS. 4 and 5-5A. In one such embodiment, the beam travel pattern 74 illustrated in FIG. 6 is a roulette weld path in the form of an epitrochoidal weld path 824. The epitrochoidal weld path 824 can be represented by a path traced by a point P attached to the origin O of a rotating circle 826 of radius R rolling around the outside of a fixed circle 828. As the rotating circle 826 rotates in a clockwise direction about the fixed circle 828 such that the circumference of the rotating circle 826 meets the circumference of the fixed circle 828, the point P moves along with the circle 826 creating the epitrochoidal weld path 824 depicted in FIG. 6. The rotating circle 826 can rotate along the fixed circle 828 so that it moves point P continuously around the center area 88 within the annular weld area 82. Different epitrochoidal weld paths having shapes other than the one shown in FIG. 6 can be created by altering the distance between point P and origin O of the rotating circle 826, by changing the radius R of the rotating circle 826, and/or by changing the diameter of the fixed circle 828.

The laser beam 24 may be advanced along the nonlinear weld path(s) 80 of the beam travel pattern 74 in a variety of ways. For example, with respect to the spiral weld path 800 shown in FIG. 4, the laser beam 24 may be advanced from the fixed outer point 804 nearest the outer diameter boundary 84 and around the several turnings of the spiral weld path 800 until it eventually stops at the fixed inner point 802 nearest the inner diameter boundary 86. As another example, with respect to the circular and elliptical weld paths 820, 822 shown in FIGS. 5-5A, the laser beam 24 may be advanced in a radially inward direction from the outermost weld path 820', 822' nearest the outer diameter boundary 84 to the innermost weld path 820", 822" nearest the innermost diameter boundary 86. The advancement of the laser beam 24 in a radially inward direction within the annular weld area 82—particularly when the nonlinear weld path(s) 80 is a spiral weld path 800 or a plurality of circular/elliptical weld path 820, 822—is generally preferred since the patterned inward movement of the laser beam 24 along the beam travel pattern 74 helps enhance the strength of the weld joint 72 by driving or sweeping porosity and other weld defects that might develop towards a region of the weld joint 72 beneath the center area 88 where they are less prone to adversely affect the strength and mechanical properties of the joint 72.

As the laser beam 24 is being advanced relative to the top surface 20 of the workpiece stack-up 10 along the beam travel pattern 74, the keyhole 78 and the molten aluminum weld pool 76 are consequently translated along a corresponding route relative to the top surface 20 since they track the movement of the laser beam 24, as illustrated best in FIGS. 2-3. In this way, the molten aluminum weld pool 76 momentarily leaves behind a trail of molten aluminum workpiece material in the wake of the travel path of the laser beam 24 and the corresponding route of the weld pool 76. This trail of molten aluminum workpiece material eventually cools and solidifies into resolidified composite aluminum workpiece material 90 (FIGS. 2-3) that is comprised of aluminum material from each of the aluminum workpieces 12, 14 (and 42 if present) penetrated by the molten aluminum weld pool 76. Eventually, when the laser beam 24 is finished tracing the beam travel pattern 74, the transmission of the laser beam 24 is terminated. At this time, the keyhole 78 collapses and the molten aluminum weld pool 76 solidifies. The collective resolidified composite aluminum workpiece material 90 obtained from advancing the laser beam 24 along the beam travel pattern 74 constitutes the weld joint 72.

The depth of penetration of the keyhole 78 and the surrounding molten aluminum weld pool 76 is controlled during advancement of the laser beam 24 along the beam travel pattern 74 to ensure the aluminum workpieces 12, 14 (and optionally 42) are fusion welded together by the weld joint 72 at the weld site 16. In particular, as mentioned above and shown best in FIGS. 2-3, the keyhole 78 and the molten aluminum weld pool 76 intersect each faying interface 34 (or 50, 52) present within the workpiece stack-up 10 between the top and bottom surfaces 20, 22 of the stack-up 10 during advancement of the laser beam 24 along the beam travel pattern 74. This means that the keyhole 78 and the molten aluminum weld pool 76 entirely traverse the thickness of the first aluminum workpiece 12 (and the thickness of the third aluminum workpiece 42 if present) while, in a preferred embodiment, only partially traverse the thickness of the second aluminum workpiece 14 so as not to extend and breach through the bottom surface 22. By causing the keyhole 78 and the molten aluminum weld pool 76 to penetrate far enough into the workpiece stack-up 10 that they intersect each faying interface 34 (50, 52), the resolidified composite aluminum workpiece material 90 produced by advancing the laser beam along the beam travel pattern 74 serves to autogenously fusion weld the aluminum workpieces 12, 14 (and optionally 42) together.

The depth of penetration of the keyhole 78 and the surrounding molten aluminum weld pool 76 can be controlled by various laser welding process parameters including the power level of the laser beam 24, the position of the focal point 62 of the laser beam 24 along a longitudinal axis of the beam 24 relative to the workpiece stack-up 10 (i.e., focal position), and the travel velocity of the laser beam 24 when being advanced along the beam travel pattern 74. These laser beam parameters can be programmed into a weld controller capable of executing instructions that dictate the penetration depth of the keyhole 78 and the surrounding molten aluminum weld pool 76 with precision. While the various process parameters of the laser beam 24 can be instantaneously varied in conjunction with one another to attain the penetration depth of the keyhole 78 and the molten aluminum weld pool 76 at any particular portion of the beam travel pattern 74, in many instances, regardless of the profile of the beam travel pattern 74, the power level of the laser beam 24 may be set to between 0.2 kW and 50 kW, or more narrowly between 1 kW and 10 kW, the travel velocity of the laser beam 24 may be set to between 2 m/min and 120 m/min or, more narrowly, between 8 m/min and 50 m/min, and the focal point 62 of the laser beam 24 may be set somewhere between 30 mm above the top surface 20 (also the outer surface 26 of the first aluminum workpiece 12) of the workpiece stack-up 10 and 30 mm below the top surface 20.

The advancement of the laser beam 24 along the beam travel pattern 74 is believed to impart good and repeatable strength, in particular peel and cross-tension strength, to the weld joint 72 by minimizing the prevalence of weld defects derivable from the protective surface coating 40 present on one or more of the aluminum workpieces 12, 14 (and optionally 42). Without being bound by theory, it is believed that advancing the laser beam 24 along the one or more nonlinear weld paths 80 of the beam travel pattern 74 within the annular weld area 82, without impinging on the center area 88, forces entrained porosity and other defects derived from hydrogen gas and/or protective coating remnants inwards into a region of the weld joint 72 beneath the center area 88 on the plane of the top surface of the workpiece stack-up 10 through conductive heat transfer. The concentration of porosity and other weld defects beneath the center area 88 is tolerable since centrally-located porosity is less likely to affect the mechanical properties of the laser spot weld joint 72 compared to porosity located at the perimeter of the weld joint 72.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of laser welding a workpiece stack-up that includes at least two overlapping aluminum workpieces, the method comprising:

providing a workpiece stack-up that includes overlapping aluminum workpieces, the workpiece stack-up comprising at least a first aluminum workpiece and a second aluminum workpiece, the first aluminum workpiece providing a top surface of the workpiece stack-up and the second aluminum workpiece providing a bottom surface of the workpiece stack-up, wherein a faying interface is established between each pair of adjacent overlapping aluminum workpieces within the workpiece stack-up, and wherein at least one of the aluminum workpieces in the workpiece stack-up includes a protective surface coating;

directing a laser beam at the top surface of the workpiece stack-up to create a molten aluminum weld pool that penetrates into the workpiece stack-up from the top surface towards the bottom surface and intersects each faying interface established within the workpiece stack-up; and forming a laser weld joint by advancing the laser beam relative to a plane of the top surface of the workpiece stack-up along a beam travel pattern that lies within an annular weld area defined by an inner diameter boundary and an outer diameter boundary on the plane of the top surface, the beam travel pattern of the laser beam surrounding a center area encircled by the annular weld area on the plane of the top surface so as to force entrained porosity inwards into a region of the weld joint beneath the center area on the plane of the top surface of the workpiece stack-up.

2. The method set forth in claim 1, wherein the first aluminum workpiece has an outer surface and a first faying surface, and the second aluminum workpiece has an outer surface and a second faying surface, the outer surface of the first aluminum workpiece providing the top surface of the workpiece stack-up and the outer surface of the second aluminum workpiece providing the bottom surface of the workpiece stack-up, and wherein the first and second faying surfaces of the first and second aluminum workpieces overlap and confront to establish a first faying interface.

3. The method set forth in claim 1, wherein the first aluminum workpiece has an outer surface and a first faying surface, and the second aluminum workpiece has an outer surface and a second faying surface, the outer surface of the first aluminum workpiece providing the top surface of the workpiece stack-up and the outer surface of the second aluminum workpiece providing the bottom surface of the workpiece stack-up, and wherein the workpiece stack-up comprises a third aluminum workpiece situated between the first and second aluminum workpieces, the third aluminum workpiece having opposed faying surfaces, one of which overlaps and confronts the first faying surface of the first aluminum workpiece to establish a first faying interface and the other of which overlaps and confronts the second faying surface of the second aluminum workpiece to establish a second faying interface.

4. The method set forth in claim 1, wherein advancing the laser beam is performed by a scanning optic laser head having tiltable scanning mirrors whose movements are coordinated to move the laser beam relative to the plane of the top surface of the workpiece stack-up along the beam travel pattern within the annular weld area.

5. The method set forth in claim 1, wherein the laser beam is a fiber laser beam, a disk laser beam, or a direct diode laser beam.

6. The method set forth in claim 1, wherein the laser beam is advanced along the beam travel pattern at a travel speed that ranges from 8 m/min to 120 m/min.

7. The method set forth in claim 1, wherein the beam travel pattern comprises a spiral weld path that revolves around and expands radially outwardly from a fixed inner point proximate the inner diameter boundary to a fixed outer point proximate the outer diameter boundary of the annular weld area.

8. The method set forth in claim 7, wherein a step size between radially-aligned points on each pair of adjacent turnings of the spiral weld path is greater than 0.01 mm and less than 0.8 mm.

9. The method set forth in claim 7, wherein the laser beam is advanced radially inwardly along the spiral weld path from the fixed outer point proximate the outer diameter boundary of the annular weld area to the fixed inner point proximate the inner diameter boundary.

10. The method set forth in claim 1, wherein the beam travel pattern comprises a plurality of radially spaced and unconnected circular or elliptical weld paths that are concentrically arranged about the center area.

11. The method set forth in claim 10, wherein a step size between radially-aligned points of each pair of adjacent circular or elliptical weld paths is greater than 0.01 mm and less than 0.8 mm.

12. The method set forth in claim 10, wherein the laser beam is advanced along the plurality of circular or elliptical weld paths in a radially inward direction from an outermost weld path proximate the outer diameter boundary of the annular weld area to an innermost weld path proximate the inner diameter boundary.

13. The method set forth in claim 1, wherein a diameter of the inner diameter boundary of the annular weld area ranges from 1 mm to 12 mm and a diameter of the outer diameter boundary ranges from 3 mm to 15 mm.

14. A method of remote laser welding a workpiece stack-up that includes at least two overlapping aluminum workpieces, the method comprising:
   providing a workpiece stack-up that includes overlapping aluminum workpieces, the workpiece stack-up comprising at least a first aluminum workpiece and a second aluminum workpiece, the first aluminum workpiece providing a top surface of the workpiece stack-up and the second aluminum workpiece providing a bottom surface of the workpiece stack-up, wherein a faying interface is established between each pair of adjacent overlapping aluminum workpieces within the workpiece stack-up, and wherein at least one of the aluminum workpieces in the workpiece stack-up includes a protective surface coating;
   operating a scanning optic laser head to direct a solid-state laser beam at the top surface of the workpiece stack-up to create a molten aluminum weld pool that penetrates into the workpiece stack-up from the top surface towards the bottom surface, the solid-state laser beam having a focal length between 0.4 meters and 2.0 meters; and
   coordinating the movement of tiltable scanning mirrors within the scanning optic laser head to advance the laser beam relative to a plane of the top surface of the workpiece stack-up along a beam travel pattern that lies within an annular weld area defined by an inner diameter boundary and an outer diameter boundary on the plane of the top surface, the beam travel pattern of the laser beam surrounding a center area encircled by the annular weld area on the plane of the top surface so as to force entrained porosity inwards into a region of a resultant weld joint beneath the center area, and wherein the laser beam is advanced along the beam travel pattern at a travel speed that ranges from 8 m/min to 120 m/min.

15. The method set forth in claim 14, wherein the workpiece stack-up includes only the first and second aluminum workpieces, or wherein the workpiece stack-up further includes a third aluminum workpiece disposed between the first and second aluminum workpieces.

16. The method set forth in claim 14, wherein, during advancement along the beam travel pattern, the solid-state laser beam has a power level ranging from 0.2 kW to 50 kW and a focal point of the solid-state laser beam is positioned between 50 mm below the bottom surface of the workpiece stack-up and 50 mm above the top surface of the workpiece stack-up on a longitudinal axis of the laser beam.

17. The method set forth in claim 14, wherein the beam travel pattern comprises a spiral weld path that revolves around and expands radially outwardly from a fixed inner point proximate the inner diameter boundary to a fixed outer point proximate the outer diameter boundary of the annular weld area, wherein a step size between radially-aligned points on each pair of adjacent turnings of the spiral weld path is greater than 0.01 mm and less than 0.8 mm, and wherein the solid-state laser beam is advanced along the spiral weld path from the fixed outer point proximate the outer diameter boundary of the annular weld area to the fixed inner point proximate the inner diameter boundary.

18. The method set forth in claim 14, wherein the beam travel pattern comprises a plurality of radially-spaced and unconnected circular or elliptical weld paths that are concentrically arranged about the center area, wherein a step size between the radially-aligned points of each pair of adjacent circular or elliptical weld paths is greater than 0.01 mm and less than 0.8 mm, and wherein the solid-state laser beam is advanced along the plurality of circular or elliptical weld paths in a radially inward direction from an outermost weld path proximate the outer diameter boundary of the annular weld area to an innermost weld path proximate the inner diameter boundary.

19. The method set forth in claim 14, wherein a diameter of the inner diameter boundary of the annular weld area ranges from 1 mm to 12 mm and a diameter of the outer diameter boundary ranges from 3 mm to 15 mm.

* * * * *